July 27, 1954
R. R. WENNER ET AL
2,684,979
PURIFICATION OF ACRYLONITRILE
Filed April 2, 1951
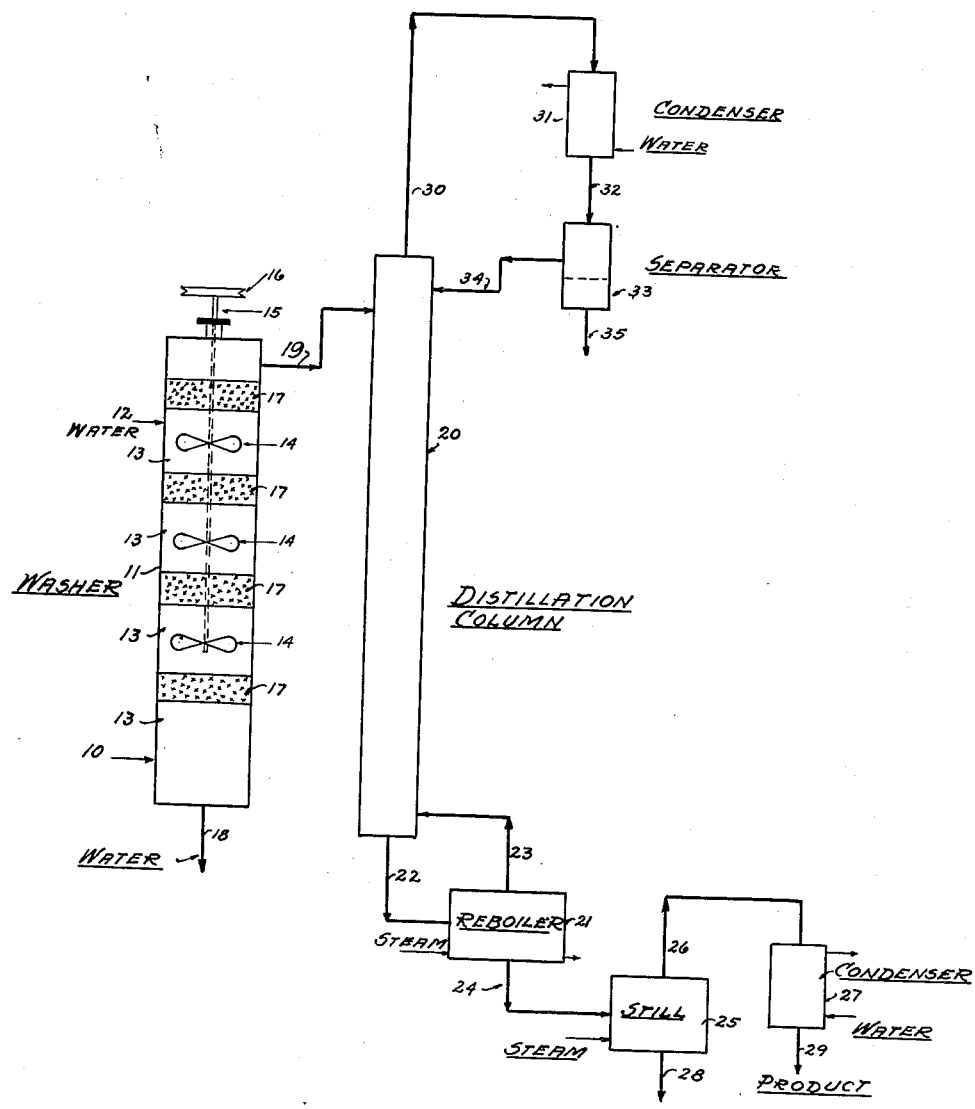
INVENTOR.
RALPH R. WENNER
GORDON H. LOVETT.
BY Patented July 27, 1954

2,684,979

UNITED STATES PATENT OFFICE 2,684,979

PURIFICATION OF ACRYLONITRILE

Ralph R. Wenner, West Carrollton, and Gordon H. Lovett, Dayton, Ohio, assignors to Monsanto Chemical Company, St. Louis, Mo., a corporation of Delaware Application April 2, 1951, Serial No. 218,746

5 Claims. (Cl. 260—465.9)

This invention relates to a method for purifying acrylonitrile. It specifically relates to a method for purifying acrylonitrile which has been prepared by the reaction between acetylene and hydrocyanic acid (HCN) in the presence of a cuprous salt catalyst. The latter method is specifically described in Reissue Patent No. 23,265, issued September 5, 1950.

When acrylonitrile is produced according to the above method a crude product is obtained which contains principally acrylonitrile together with minor amounts of 2-chlorobutadiene, monovinyl acetylene, divinyl acetylene and lactonitrile. The crude product so obtained may be dissolved in water, forming a dilute solution (approximately 2% by weight), which solution contains, in addition to acrylonitrile, the impurities referred to above. The water solution so obtained may be treated by the process disclosed in Lovett Patent No. 2,526,676, in which process a stream of acetylene is contacted with the water solutions for the purpose of eliminating the acetylene polymer impurities therefrom. According to the process disclosed in the said Lovett patent, these impurities are transferred to the acetylene gas from whence they may readily and safely be removed.

The water solution of acrylonitrile resulting after treatment with the gaseous acetylene by the Lovett process generally contains some water-soluble impurities such as lactonitrile and hydrocyanic acid, which impurities are soluble to such an extent that they are not readily transferred to the acetylene gas together with the less soluble impurities.

Upon treating the water solution of acrylonitrile, from which the acetylene polymer impurities have been removed, as described in the above Lovett patent, the acrylonitrile is removed by stripping from the solution and recovered in concentrated form. The acrylonitrile so recovered, however, still contains lactonitrile, the latter having been vaporized and condensed simultaneously with the acrylonitrile. At this point in the process, the acrylonitrile product will contain in the neighborhood of 98+% of acrylonitrile, up to 1% of water, 0.15–0.2% lactonitrile, 0.04–0.1% of HCN and 0.1 to 0.2% of acetaldehyde.

For certain purposes this product may be directly dehydrated and a relatively pure material obtained. However, for certain other purposes it is desirable that the lactonitrile be substantially completely removed.

We have now found that the above crude product may be purified by washing or extracting the product with water, the amount of water employed being sufficient to dissolve at least 10%, but not substantially more than 35% of the acrylonitrile. Washing is carried out by intimately contacting the crude acrylonitrile with water by shaking, stirring together or by other means for achieving intimate contact. When the amount of water employed is maintained so as to dissolve acrylonitrile within the limits stated above, it is found that the sum of the acetaldehyde, lactonitrile and HCN impurities are simultaneously reduced to less than 0.002%. The acrylonitrile so treated is, of course, saturated with water.

The above-mentioned water washing or extraction step may be carried out preferably at room temperature, although the temperature is not critical and it may be varied as convenient.

Following the water washing step the acrylonitrile is dehydrated. Dehydration may take the form of chemical dehydration wherein the wet acrylonitrile is contacted with water-absorbing agents, such as, for example, activated alumina. The wet acrylonitrile may also be dehydrated by distillation which is carried out at substantially atmospheric pressure. Upon subjecting the acrylonitrile-water solution to fractional distillation an overhead product consisting of acrylonitrile containing water is obtained, the product is condensed and cooled and allowed to separate into two phases. The two phases consist of a wet acrylonitrile phase and a water phase. The acrylonitrile phase may be returned to the column as reflux, while the water phase is returned to an earlier step in the process for recycling.

The wet acrylonitrile, which it is desired to dehydrate, may be distilled and condensed as a homogeneous mixture which, upon cooling, separates into two phases. As the temperature of the two phases is lowered the amount of water separating out as a separate phase increases to such an extent that when the mixture is cooled to 30° C. approximately one-half of the contained water is separated as the aqueous phase.

The water phase which is separated from the acrylonitrile phase contains small amounts of hydrocyanic acid and acetaldehyde and may be subjected to further purification by returning it to the wet acrylonitrile product flowing to the washer.

The present invention will be further described and explained by reference to the accompanying drawing showing a diagrammatic flow sheet of the process.

In the drawing, numeral 10 represents a pipe carrying acrylonitrile which has been prepared by the process of Reissue Patent No. 23,265 and which contains lactonitrile as an impurity therein. The acrylonitrile may have been initially purified by the removal of acetylene polymer impurities according to the process disclosed in Lovett Patent No. 2,526,676. Pipe 10 connects with washer 11, to which water is introduced by means of pipe 12. Sufficient water is added to the washer so as to dissolve at least 10%, but not more than 35% of the acrylonitrile.

Washer 11 is provided with a series of unpacked zones 13, some of which are provided with a mechanical agitating device 14 which may take the form of a propeller-type agitator. The agitators are driven by means of a central shaft 15 carrying a pulley 16, to which a motor, not shown, may be belted. Intermediate the unpacked zones are arranged packed zones 17.

As will be noted, the acrylonitrile containing the impurities to be washed out flows countercurrent to the washing water, the acrylonitrile being lighter than the water rises to the top of the column, while the heavier water sinks to the bottom. Two phases are thus present in the washer and we have found that in the packed zone, which is quiescent due to the presence of the packing, a separation of acrylonitrile from water occurs. However, the separation does not form a layer, but rather forms very small globules of acrylonitrile. These small globules rise slowly but do not coalesce because of the presence of packing in the packed zone. Upon entering the unpacked agitated zone 13, in the drawing, the small globules of acrylonitrile are intimately dispersed in the water phase by the agitator. This process is repeated throughout the passage of the two liquid phases through the washer and results in very efficient contact of the two phases with each other and a consequent lowering of the soluble impurities contained in the acrylonitrile.

The wash water, which has become saturated with acrylonitrile, leaves washer 11 by pipe 18. This water solution of acrylonitrile may be treated by boiling to recover the contained acrylonitrile which, after recovery, is then returned to pipe 10. The washed acrylonitrile saturated with water leaves washer 11 by pipe 19 and enters distillation column 20.

Column 20 may be either of plate or packed construction and is operated at substantially atmospheric pressure. The contents are heated to the distillation temperature by means of reboiler 21, which in turn is heated by steam coils arranged therein. Liquid from the column enters reboiler 21 by means of pipe 22, while vapor leaves reboiler 21 entering column 20 by means of pipe 23. Dehydrated acrylonitrile leaves reboiler 21 by pipe 24 and if desired may be cooled and collected as the finished product.

The product so obtained is sufficiently pure for many purposes, however, it may have a slight yellowish color which it may be desirable to remove. If this is the case, the product obtained from pipe 24 is flowed to a flash still indicated by 25. In this still it is again distilled but without reflux. The vapors so obtained from the flash still leave by means of pipe 26 and enter water-cooled condenser 27. The residue from flash still 25 is withdrawn by pipe 28, whereas the pure water-white product is then obtained from pipe 29.

In case a non-volatile polymerization inhibitor such, for example, as methylene blue has been employed in column 20 the inhibitor is obtained in the residue and is also removed by means of pipe 28.

At the top of column 20 the vapors are conducted by means of pipe 30 into water-cooled condenser 31. Preferably a homogeneous condensate is first formed in the condenser by condensation of wet acrylonitrile therein. Upon further cooling of the condensate a water phase separates and the two phases flow through pipe 32 into separator 33. Here the lighter acrylonitrile layer again rises to the top of the heavier water layer and is flowed to column 20 by pipe 34 serving as reflux in said column. The water layer leaves by pipe 35 and if it is desired to recover contained acrylonitrile it may be returned to pipe 10 to be recycled.

In place of conducting the extraction in a single operation as herein illustrated, the extraction may as readily be conducted in a series of vessels, individual members of which are agitated and quiescent. Since acrylonitrile is lighter than water, separation of the light from the heavy phase can be made and the flow of the two liquids arranged in counter-current fashion.

What we claim is:

1. The process which comprises contacting a crude acrylonitrile containing water-soluble impurities with an amount of water sufficient to dissolve at least 10% but not substantially in excess of 35% by weight thereof, said contacting being carried out in a series of alternating quiescent and agitated zones, and recovering acrylonitrile substantially free of said impurities.

2. The process which comprises contacting a crude acrylonitrile containing water-soluble impurities therein with an amount of water sufficient to dissolve at least 10% but not substantially in excess of 35% by weight thereof, said contacting being carried out in a series of alternating quiescent and agitated zones, separating a wet acrylonitrile substantially free of said impurities, and dehydrating said acrylonitrile.

3. The process which comprises contacting a crude acrylonitrile containing water-soluble impurities including lactonitrile, with an amount of water sufficient to dissolve at least 10% but not substantially in excess of 35% by weight thereof, said contacting being carried out in a series of alternating quiescent and agitated zones, separating acrylonitrile substantially free of lactonitrile and then dehydrating said acrylonitrile.

4. The process which comprises contacting a crude acrylonitrile containing water-soluble impurities in counter-current flow with an amount of water sufficient to dissolve at least 10% but not substantially in excess of 35% by weight thereof, said contacting being carried out in a series of alternating quiescent and agitated zones and recovering acrylonitrile substantially free of said impurities.

5. The process which comprises contacting a crude acrylonitrile containing water-soluble impurities of the class consisting of lactonitrile and hydrocyanic acid with an amount of water sufficient to dissolve at least 10% but not substantially in excess of 35% by weight thereof, said contacting being carried out in counter-current flow and in alternating quiescent and agitated zones and recovering acrylonitrile substantially free of said impurities.

References Cited in the file of this patent

UNITED STATES PATENTS

| Number | Name | Date |
|---|---|---|
| 2,183,357 | Ritchie et al. | Dec. 12, 1939 |
| 2,324,854 | Kurtz et al. | July 20, 1943 |
| 2,385,549 | Spence | Sept. 25, 1945 |
| 2,417,635 | Davis | Mar. 8, 1947 |
| 2,452,554 | Davis et al. | Nov. 2, 1948 |
| 2,579,638 | Zwilling et al. | Dec. 25, 1951 |

OTHER REFERENCES

Nill et al., Fiat Final Report No. 1125, 1 pp. 9 and 10 (1947).